Oct. 8, 1940.                J. D. ALTEMUS                2,216,930
                    STABILIZING MECHANISM FOR VEHICLES
                    Filed Feb. 25, 1939          11 Sheets-Sheet 1

INVENTOR:
James Dobson Altemus,
BY
His ATTORNEY

Oct. 8, 1940.  J. D. ALTEMUS  2,216,930
STABILIZING MECHANISM FOR VEHICLES
Filed Feb. 25, 1939  11 Sheets-Sheet 2

INVENTOR:
James Dobson Altemus;
BY
His ATTORNEY.

Oct. 8, 1940.                    J. D. ALTEMUS                    2,216,930
                        STABILIZING MECHANISM FOR VEHICLES
                        Filed Feb. 25, 1939         11 Sheets-Sheet 4

INVENTOR:
James Dobson Altemus,
BY
ATTORNEY.

Oct. 8, 1940.   J. D. ALTEMUS   2,216,930
STABILIZING MECHANISM FOR VEHICLES
Filed Feb. 25, 1939   11 Sheets-Sheet 6

INVENTOR:
James Dobson Altemus,
BY
ATTORNEY.

Oct. 8, 1940.   J. D. ALTEMUS   2,216,930
STABILIZING MECHANISM FOR VEHICLES
Filed Feb. 25, 1939   11 Sheets-Sheet 7

INVENTOR:
James Dobson Altemus,
BY
His ATTORNEY.

Oct. 8, 1940.                J. D. ALTEMUS                2,216,930
                    STABILIZING MECHANISM FOR VEHICLES
                    Filed Feb. 25, 1939        11 Sheets-Sheet 8
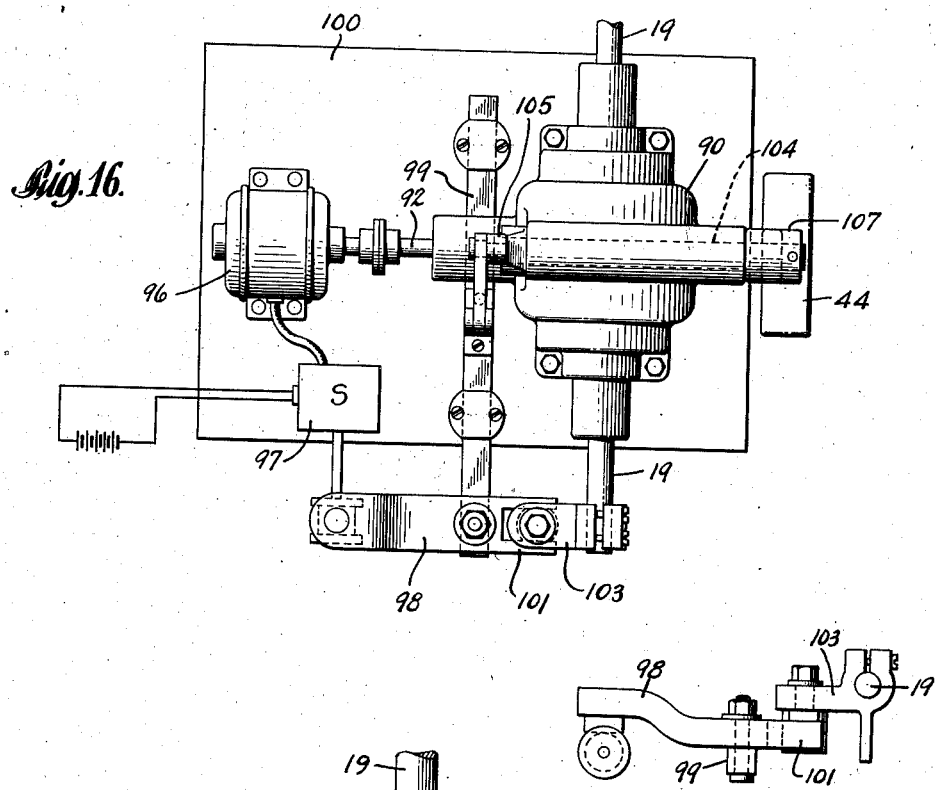
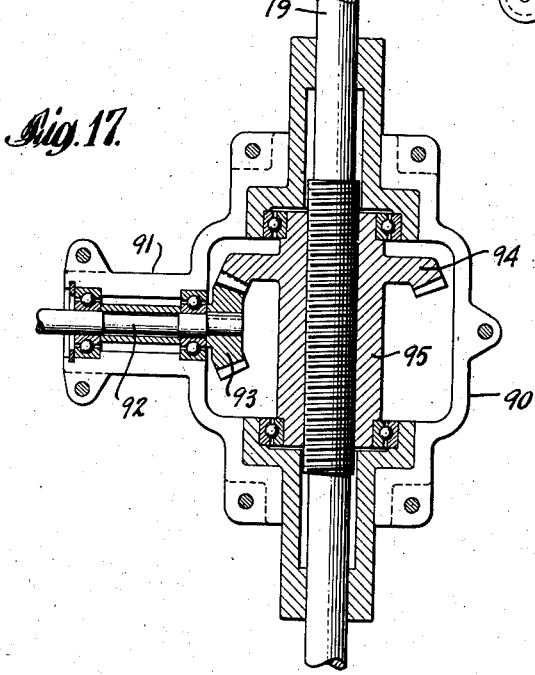
INVENTOR:
James Dobson Altemus,
BY
His ATTORNEY.

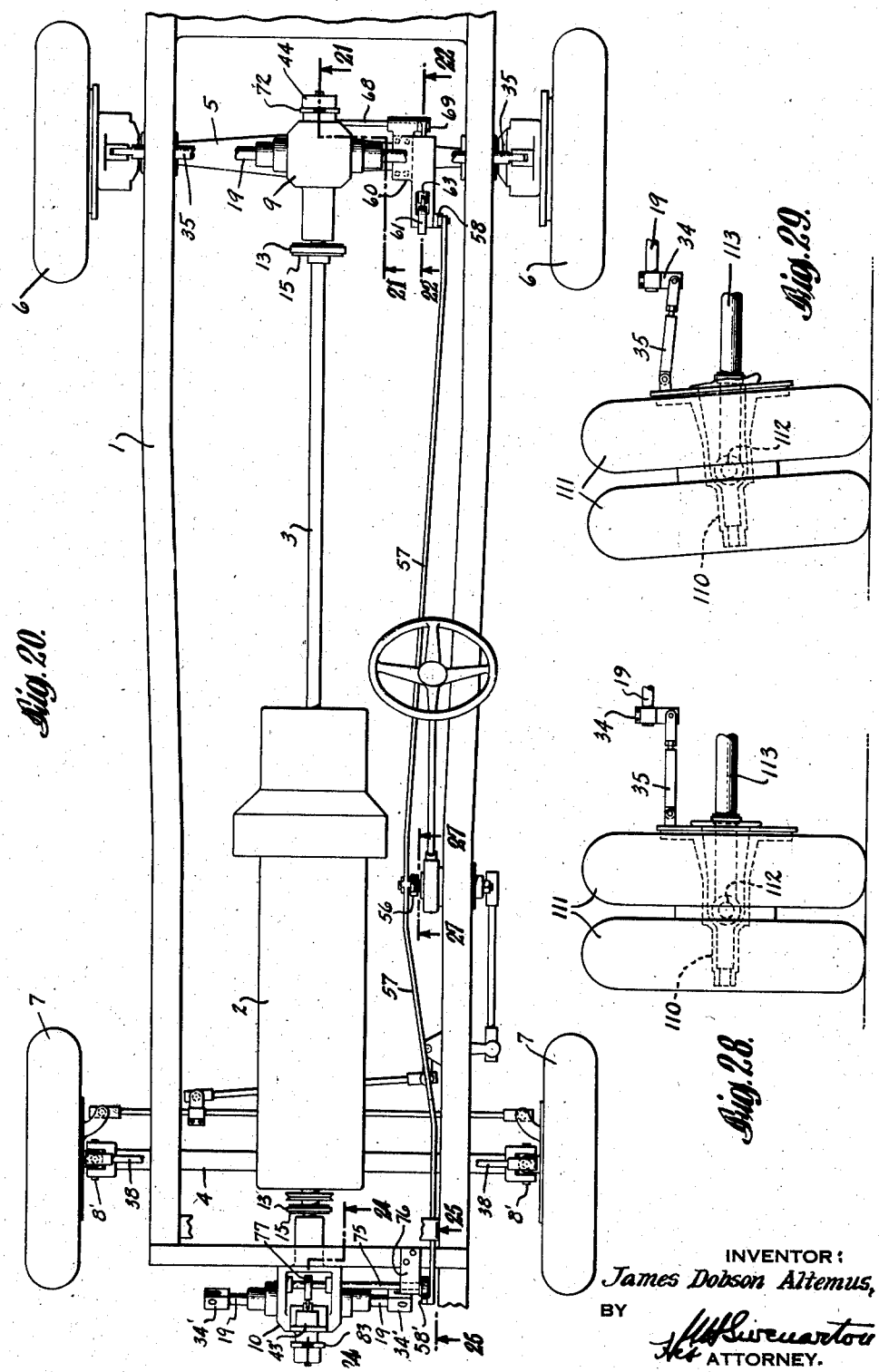

Oct. 8, 1940.   J. D. ALTEMUS   2,216,930
STABILIZING MECHANISM FOR VEHICLES
Filed Feb. 25, 1939   11 Sheets-Sheet 10

INVENTOR:
James Dobson Altemus,
BY
ATTORNEY.

Oct. 8, 1940.   J. D. ALTEMUS   2,216,930
STABILIZING MECHANISM FOR VEHICLES
Filed Feb. 25, 1939   11 Sheets-Sheet 11

INVENTOR:
James Dobson Altemus,
BY
His ATTORNEY.

Patented Oct. 8, 1940

2,216,930

UNITED STATES PATENT OFFICE 2,216,930

STABILIZING MECHANISM FOR VEHICLES

James Dobson Altemus, Roslyn, N. Y.

Application February 25, 1939, Serial No. 258,544

13 Claims. (Cl. 280—87)

This invention relates to wheel tilting mechanism for vehicles, as automobiles, railway cars, air planes and the like and has for its particular objects the provision of a compact, sturdy and cheap mechanism for that purpose which is capable of minimizing the tendency of the vehicle wheels of skidding under the influence of centrifugal force when rounding a sharp turn in the pavement or under other conditions of travel such as on wet pavements when skidding might otherwise occur.

Further objects of the invention are the provision of a valve-less mechanism that is either operably connected to the main shaft of the vehicle or to an independent electric motor and which is responsive to a pendulum controller such for example as the type disclosed in my co-pending application Ser. No. 240,747.

Other objects of the invention are the provision of means for positively locking the pendular controller in a neutral position to prevent the vibration or swaying thereof during travel of the vehicle in a straight path while rendering the same susceptible of being instantly released and freely responsive to centrifugal forces when the front wheels of the vehicle are turned from such straight path as well as also responsive to unusual centrifugal forces developed as a result of a skidding impulse on wet pavements, even prior to the turning of the front wheels, whereby further skidding of the wheels is resisted or even entirely prevented. Still other advantages of the invention are hereinafter set forth.

My invention is fully set forth in the following detailed description and drawings forming a part thereof, in which latter Figure 1 is a plan view of a chassis of an automobile equipped with my improved mechanical type of wheel-tilting mechanism;

Figure 1:
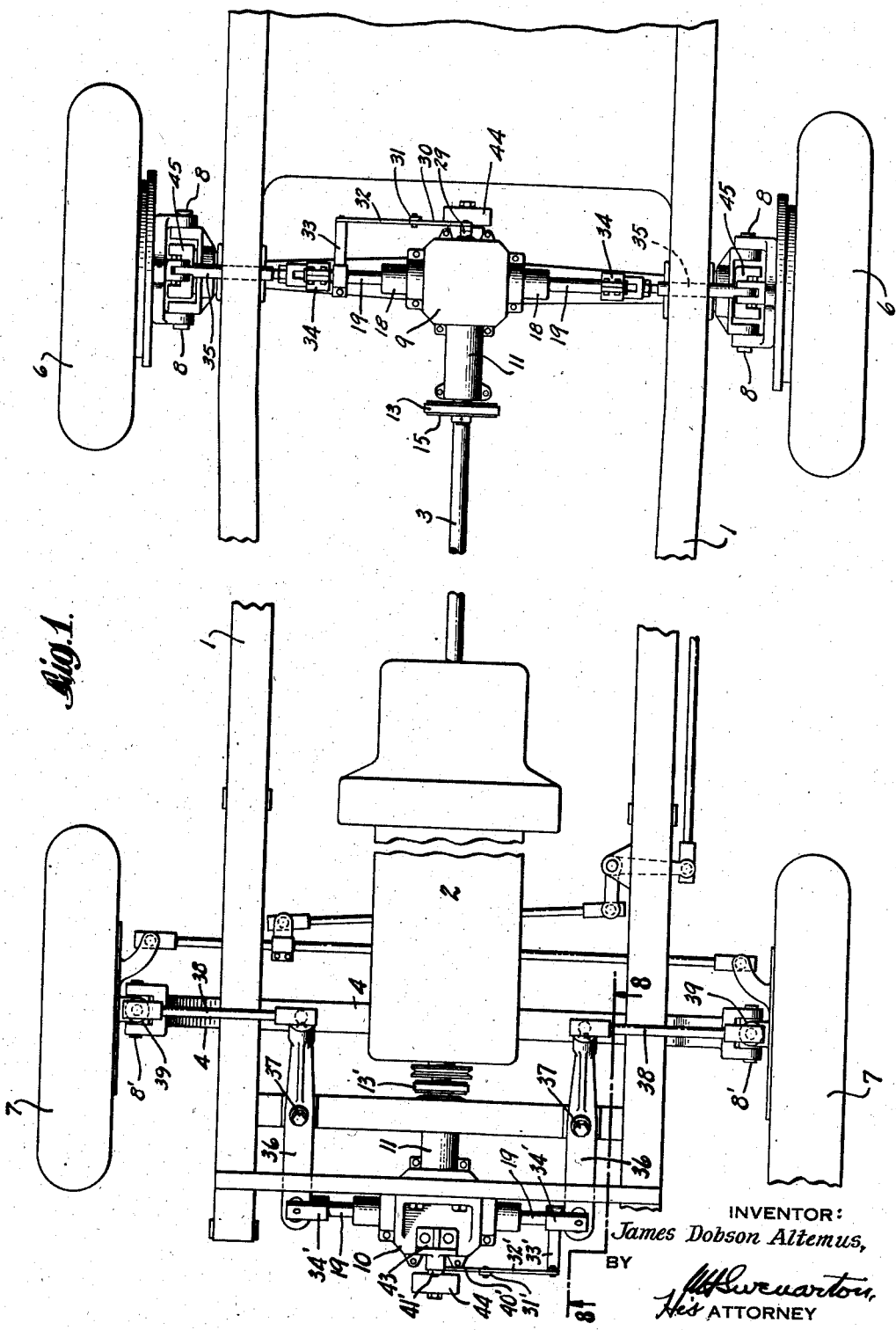
Figure 2:
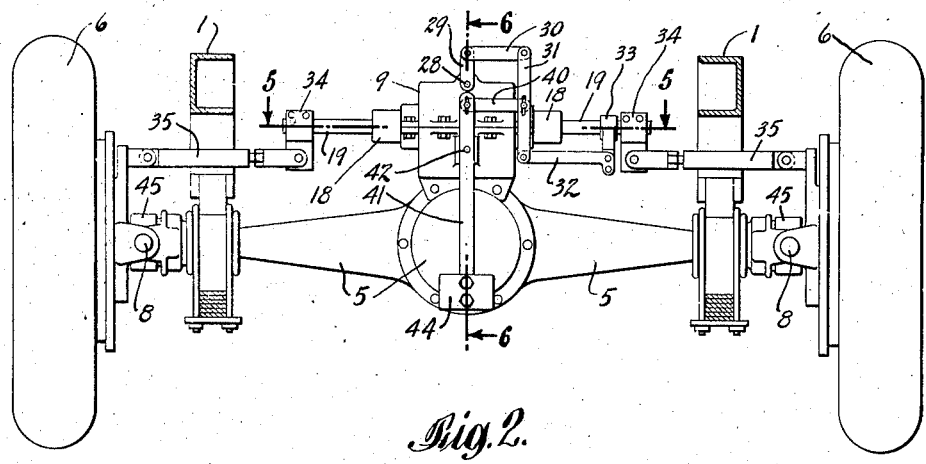
Figs. 2 and 3 are rear elevations of the aforesaid chassis, showing the wheels in a normal and extreme tilted position, respectively.
Figure 5:
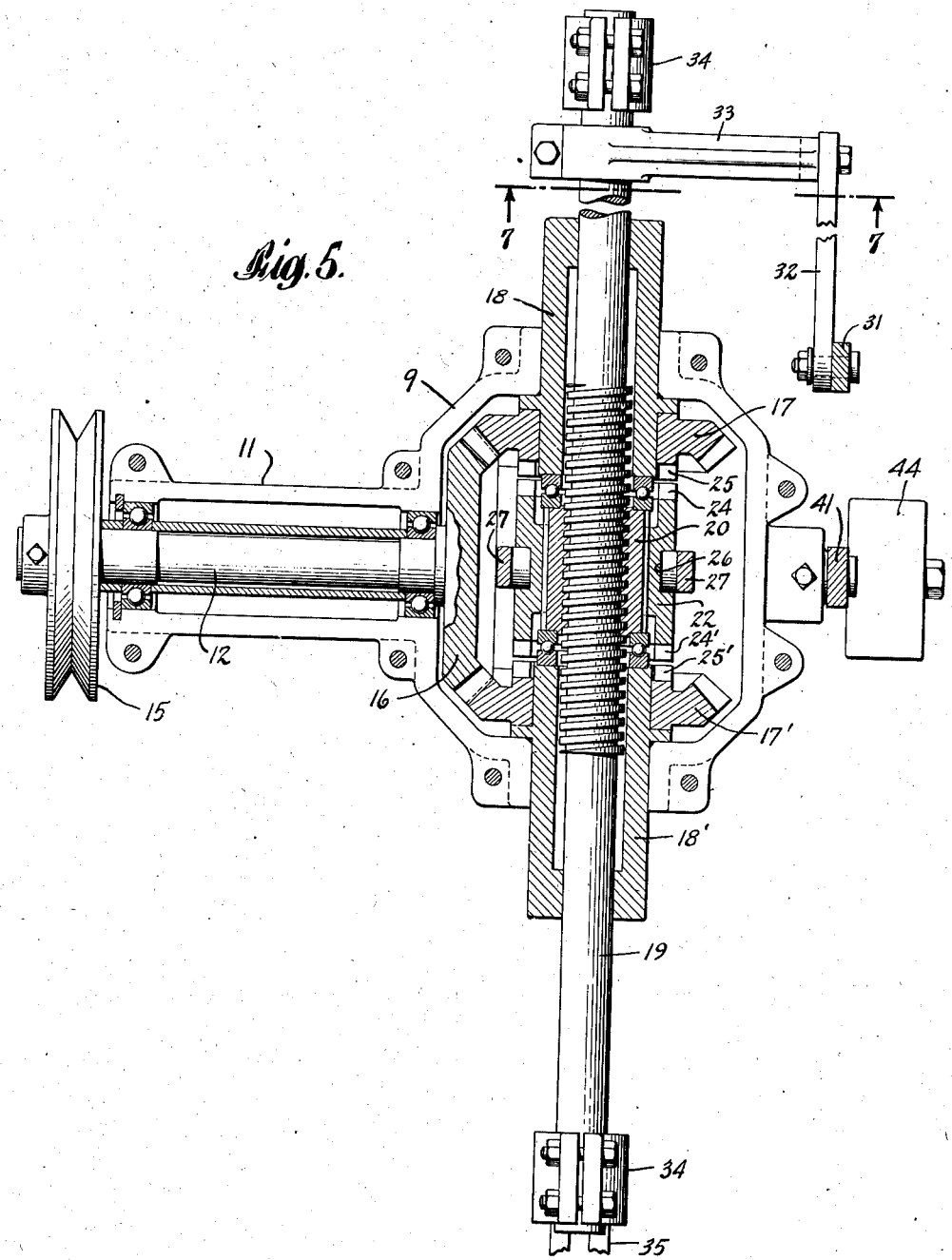
Fig. 5 is an enlarged horizontal section taken on the line 5—5 of Fig. 2.
Figure 6:
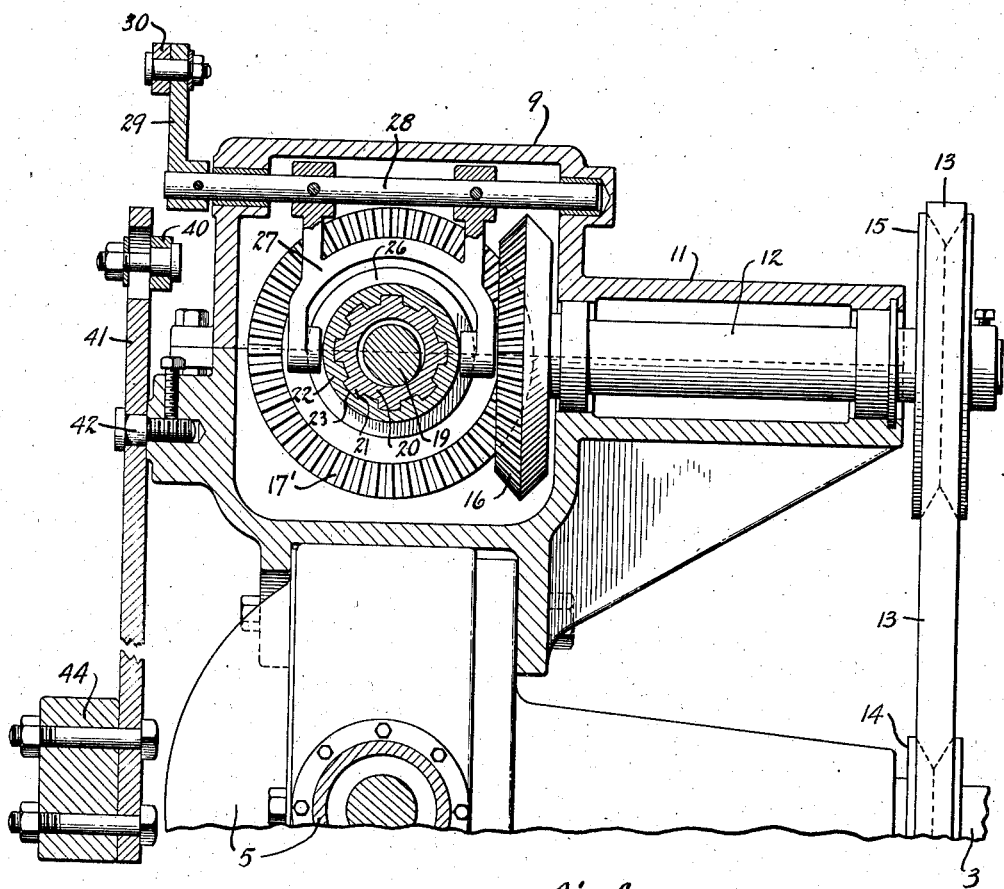
Figure 7:
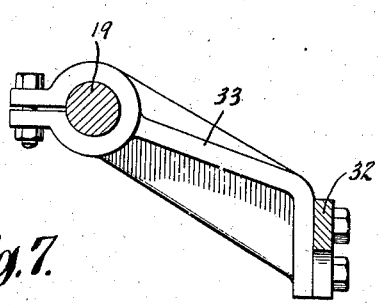
Figure 8:
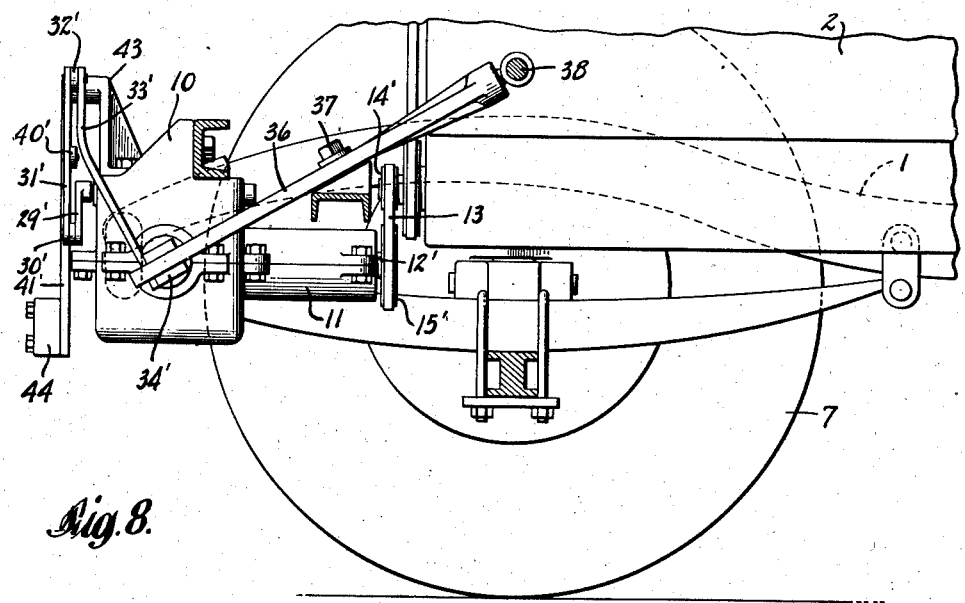
Figure 9:
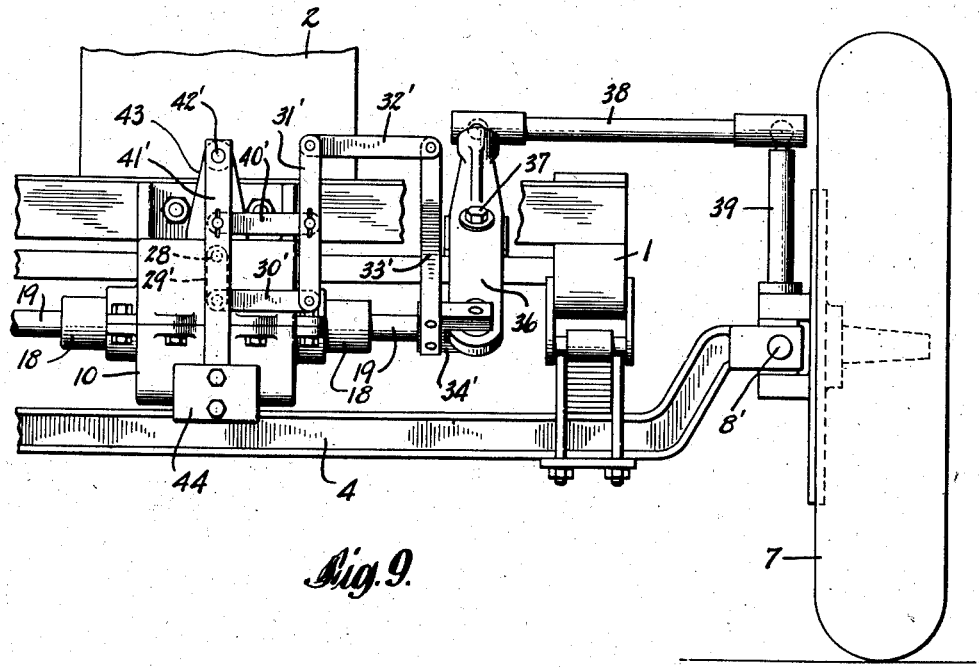
Figure 10:
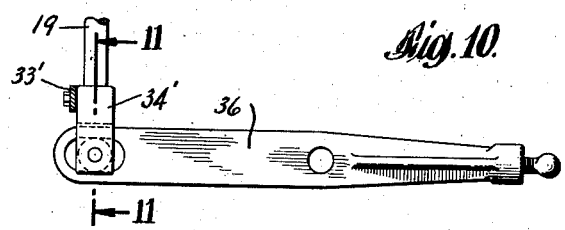
Figure 11:
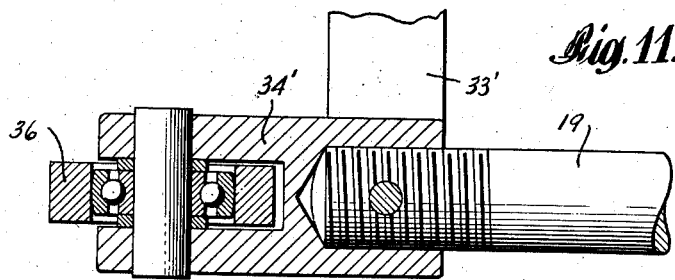
Figure 12:
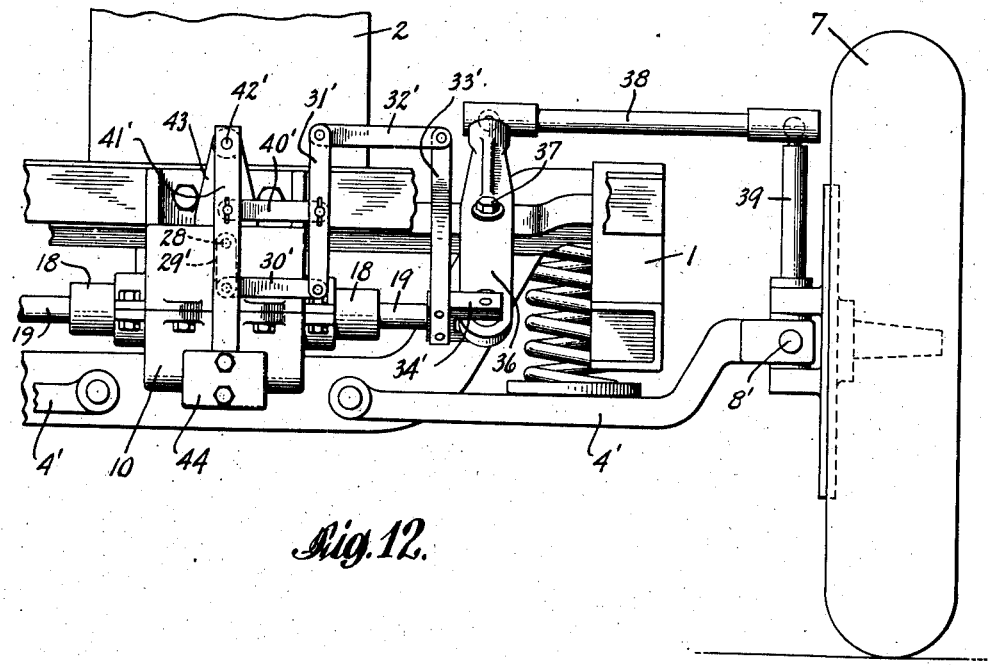
Figure 13:
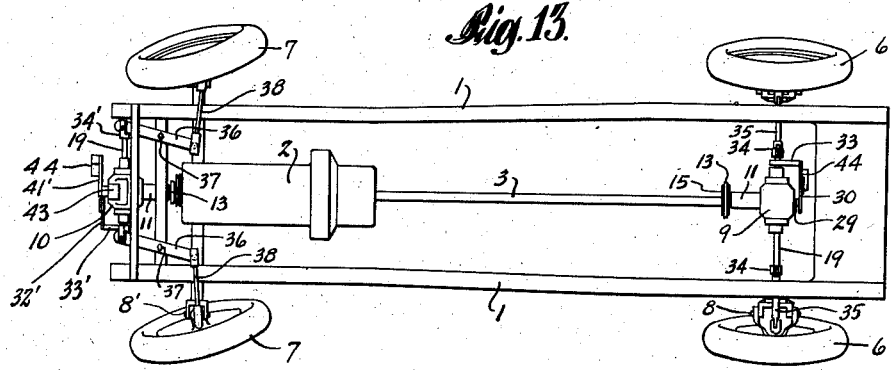
Figures 14, 15:
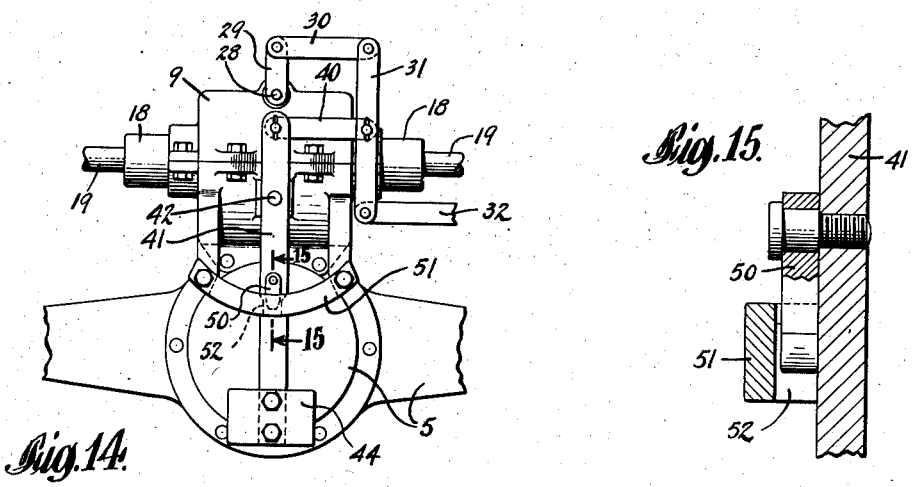
Figure 19:
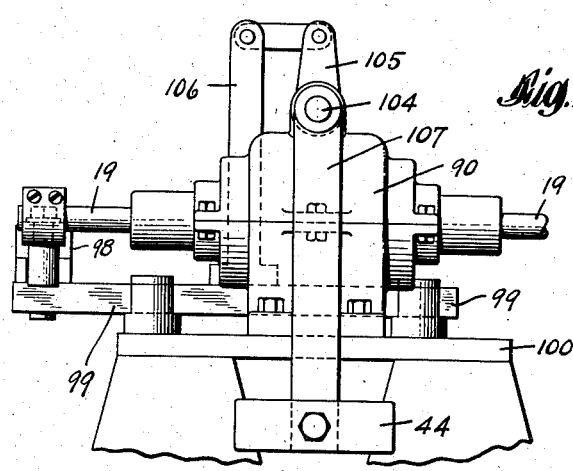
Figure 21:
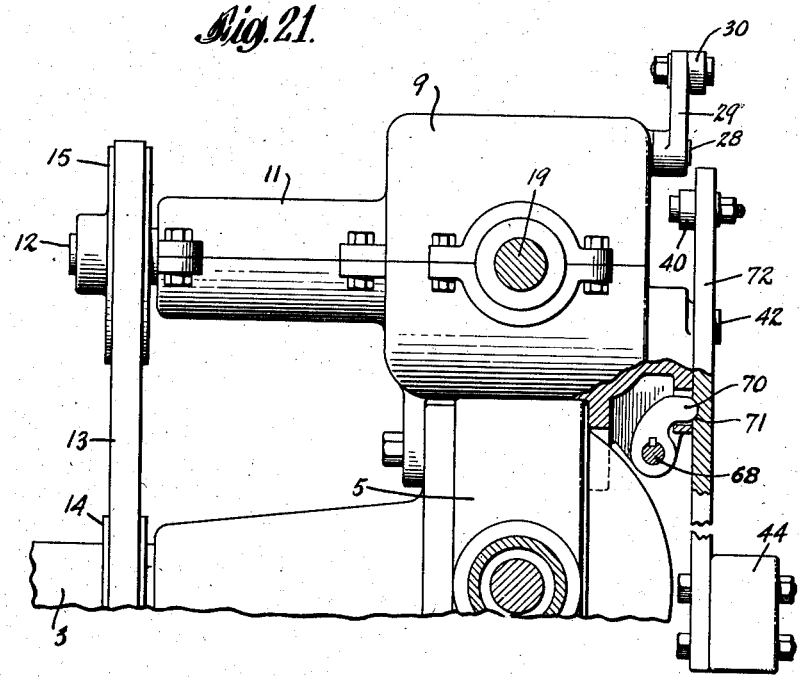
Figure 22:
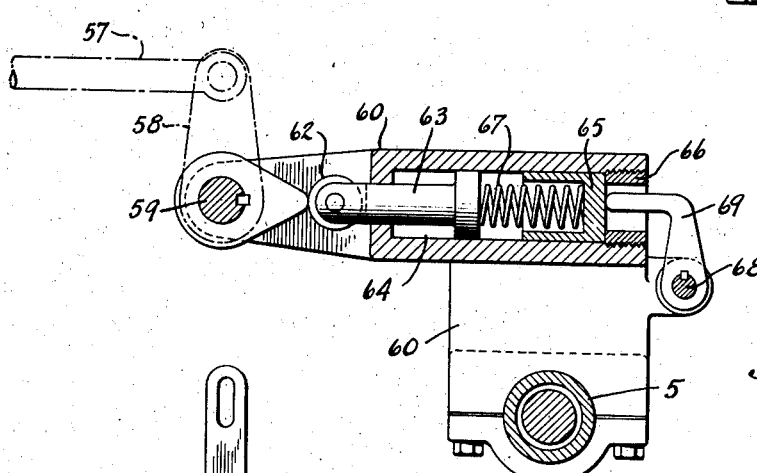
Figure 23:
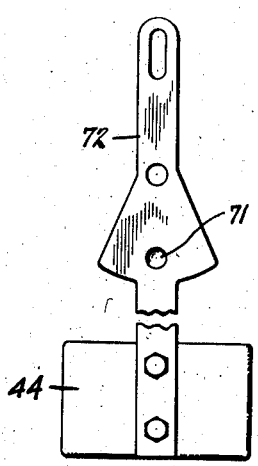
Figure 24:
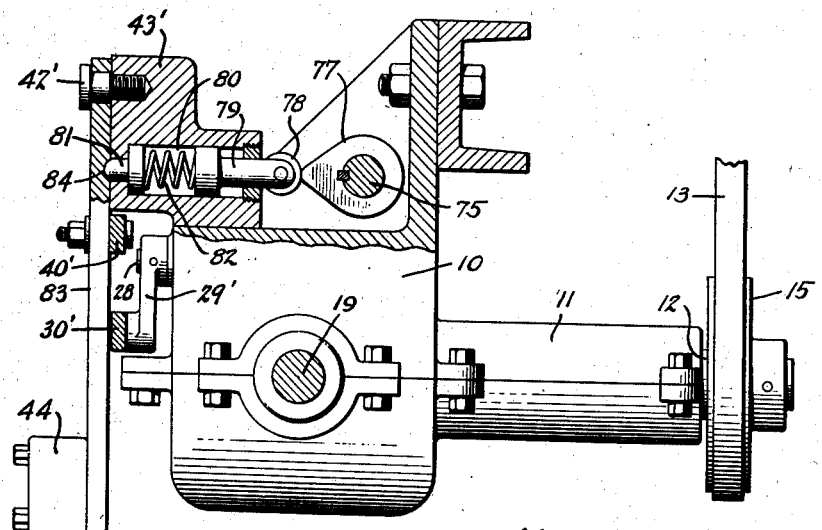
Figure 26:
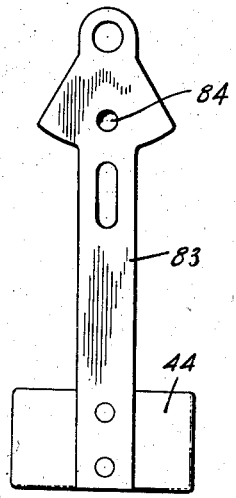
Figure 25:
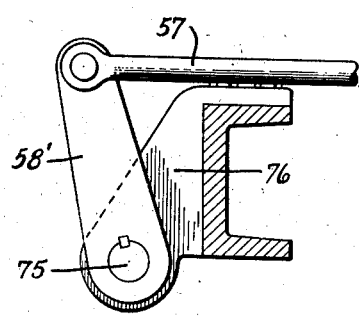
Figure 27:
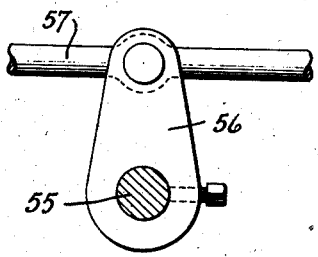

Figs. 6 and 7 are vertical sections taken respectively on the lines 6—6 of Fig. 2 and 7—7 of Fig. 5;

Fig. 8 is a fragmentary side elevation taken on the line 8—8 of Fig. 1; and Fig. 9 a fragmentary front elevation of the front end of the chassis;

Fig. 10 is a fragmentary plan view of the inclined front tilting lever shown in Fig. 1; and Fig. 11 is a vertical section on the line 11—11 of Fig. 10;

Fig. 12 is a fragmentary front elevation of a modification wherein the tilting mechanism is applied to independently sprung front wheels of a vehicle;

Fig. 13 is an essentially diagrammatic plan view generally similar to Fig. 1 but showing all four wheels of the vehicle tilted to an extreme position and the front wheels turned to the permissible limit, as when rounding a sharp turn at moderate speed;

Fig. 14 is a detail rear elevation showing a modification wherein the back-lash is prevented of the pendulum; and Fig. 15 is a vertical section taken on the line 15—15 of Fig. 14;

Fig. 16 is a plan view of a modification showing an electrically driven tilting mechanism applied to the rear end of a vehicle;

Fig. 17 is a horizontal, fragmentary section of the clutch and wheel tilting shaft employed in the modification shown in Fig. 16;

Fig. 18 is a side elevation of the floating lever shown in Fig. 16 together with the associated parts;

Fig. 19 is a rear elevation of the pendular mechanism illustrated in Fig. 16;

Fig. 20 is a plan view of a modification wherein the initial movement of the pendulum is essentially, but not entirely, responsive to the steering wheel;

Figs. 21 and 22 are vertical sections taken respectively on the line 21—21 and 22—22 of Fig. 20;

Fig. 23 is a rear elevation of the pendulum shown in Fig. 21, isolated;

Figs. 24 and 25 are vertical sections taken respectively on the lines 24—24 and 25—25 of Fig. 20;

Fig. 26 is an elevation of the front pendulum shown in Fig. 20, isolated;

Fig. 27 is a vertical section, taken on the line 27—27 of Fig. 20;

Figs. 28 and 29 are elevations of a dual truck or bus wheel equipped with my improved wheel tilting mechanism and showing the same in a normal or vertical position and tilted position, respectively.

Referring to Figs. 1 to 11, inclusive, the reference numeral 1 designates the longitudinal frame members of the chassis, 2 the engine, 3 the main drive shaft or propelling shaft which is connected in the conventional manner to the engine shaft through the common clutch mechanism. The reference numeral 4 designates the front axle and 5 the housing for the conventional differential gears and rear axles, 6 the rear wheels and 7 the front wheels. The rear and front wheels are articulated to their respective axles, the former through universal joints of a type well known in the manner described in my co-pending application No. 240,747 of which this application is a continuation in part, so as to admit of the same being tiltable by means of the improved mechanism hereinafter described, about the horizontal trunnions 8 and 8', respectively, all without interfering with the steering of the front wheels or the positive drive of the rear wheels by the drive shaft acting through the differential gearing and the conventional respective rear half axles. Generally similar rear and front gear cases or housings 9 and 10 are respectively supported by the differential housing 5 and by the front transverse frame member, the same each having a tubular extension 11 for the reception of a stub shaft 12 which is journalled therein. The stub shafts are respectively driven by the vehicle propelling shaft 3 and by the engine shaft, but at reduced speed as compared therewith, through the agency of the belts, 13, 13' which are reeved respectively over pulleys 14, 14' carried by the engine shaft and also the main propelling shaft and thence over pulleys 15, 15' carried by the stub shafts.

In Figs. 5 and 6, I have illustrated in detail the rear housing 9 and the mechanism housed therein, which will now be described, but it is understood that such description also fits the mechanism housed in the front housing 10. As shown in these views, a bevel gear 16 is fixed to the inner end of the stub shaft 12 and the same permanently meshes with opposed idling bevel gears 17 and 17' that are rotatably mounted on elongated hollow journals 18, 18' which serve as bearings for a wheel-tilting, screw shaft 19 that is connected through intermediate clutch mechanism with the said stub shaft 12.

Said clutch mechanism includes an internally threaded sleeve 20, which has external longitudinal splines 21 formed thereon and which is threaded on said screw shaft 19, and a second sleeve 22 which has internal grooves 23 that receive said splines 21 and which is slidably mounted on the sleeve 20. At each end of the second sleeve is disposed an annular series of clutch teeth 24, 24' and an annular series of cooperating clutch teeth 25, 25' is respectively formed on the internal faces of each of the bevel gears 17, 17'. The sleeve 22 has a central peripheral groove 26 formed thereon which receives the ends of a yoke 27 with which it permanently engages and which yoke is fixed to a rocker shaft 28 rotatably mounted in the housing. A rocker arm 29 or 29' is connected, through the links 30 or 30' and 31 or 31' to a horizontal connecting arm 32 or 32' that is rigidly secured to the end of operating arm 33 or 33' which is clamped on the wheel-tilting shaft 19. The rear screw shaft 19 has forked terminal blocks 34 clamped thereon adjacent its ends and the front screw shaft 19 carries a forked block 34' at each of its ends. Adjustable forked links 35 are pivotally secured to said blocks 34 and also to the respective rear wheels at a point adjacent the top of the stationary cap plate of the brake drum thereof. Inclined levers 36 are pivotally secured to a cross brace on the vehicle frame by a fulcrum 37, the same being connected by ball joints to connecting rods 38 which latter are in turn connected, also through ball joints to extensions 39 of the respective king pins of the front vehicle wheels. The other ends of the levers 36 are pivotally connected through a special joint equipped with a ball bearing to said forked blocks 34' carried by the opposite ends of the front screw shaft 19 and, due to the inclined mounting of said levers, allowance is made in such joints for the necessary angular movement of these levers during the pivotal movement thereof.

A link 40 is adjustably connected at one of its ends to the floating lever 31 adjacent the middle thereof and at its other end to the upper end of a pendulum arm 41 that is fulcrumed at 42 to the housing 9. The corresponding link 40' at the front end of the vehicle is adjustably connected to the mid-point of link 31' and is connected to the pendulum arm 41' adjacent, but not at, the top thereof. The arm 41' is pivotally suspended from a fulcrum 42' carried by the bracket 43 that is bolted to the casing 10 (see Fig. 9). Weights 44 are secured to said pendulum arms 41 and 41' respectively.

The rear wheels are driven in the customary manner by the main drive shaft, acting through the differential gears and the conventional half axles operatively connected with said gears and said wheels. The front wheel steering mechanism is also conventional.

In the modification shown in Fig. 12, the front wheels are independently sprung in the well known manner, the front axle having a forked bar 4' articulated thereto by which it is pivotally secured at its forked end to the trunnion 8' of the aforesaid articulated joint, otherwise the construction is essentially the same as that illustrated in Fig. 9.

In the modification shown in Figs. 14 and 15, a dog 50 is pivotally mounted on the pendulum arm 41 intermediate the ends thereof and an arcuate bar 51 is bolted at its respective ends to gear case 9. Said bar has a central slot, which is flared at the top entrance thereof, that is adapted to receive the end of said dog and functions as hereinafter explained. The same construction may be employed on the front pendulum if desired.

In the modification illustrated in Figs. 20 to 27, the free movement of the pendulum is dependent upon the particular position of the steering wheels, the same being restricted when the vehicle is travelling in a straight path but otherwise being essentially unrestricted. In this construction, the pitman shaft 55 is extended inwardly and provided with a lever 56 to which is pivoted a forwardly and rearwardly extending rod 57. The latter is pivotally connected at its respective ends to rocker arms 58 and 58', the former or the rear rocker arm, being mounted on a rocker shaft 59 which is journalled in the fork of a bracket 60 carried by the rear axle housing 5. To the rocker shaft 59 is keyed a pendulum-releasing cam 61 and this is adapted to permanently ride on a roller 62 carried by a plunger 63, which latter reciprocates in a cylinder 64 that is formed in the bracket 60. A second hollow plunger 65 is retained within said cylinder 64 by an annular set screw 66 and a spring 67 is interposed between the two aforesaid plungers. A second rocker shaft 68, one end of which is journalled in bracket 60, carries a rocking lever 69, the outer tip of which normally engages the plunger 65. The end of the rocker shaft 68 is journalled in ears carried by the gear case 9 and has keyed thereon a detent lever 70, the tip of which normally rests in a recess 71 formed in the rear face of pendulum arm 72. As the tension of the spring 67 is relieved due to the turning of the front wheels from a straight path, the pressure exerted on the tip of the detent 70, is correspondingly relieved and the pendulum is more or less free to move in accordance with the degree to which the tension thereon is relieved.

The rocker arm 58' (see Figs. 24 and 25) is mounted on rocker shaft 75 journalled in a frame member 76 at one end and in the gear housing 10 at the other end. Said rocker shaft 75 carries a pendulum-releasing cam 77 which permanently rides on a roller 78 carried by a plunger 79 which reciprocates in a cylinder 80 formed in the pendulum-supporting bracket 43'. A detent pin 81 projects through the end of said cylinder and a coil spring 82 is interposed between the head of said pin and the plunger 79. A pendulum 83, which is provided with a recess 84 to receive the arcuate end of said detent pin 81, is pivotally secured by a pivot pin 42' to the block 43'.

In the modification illustrated in Figs. 16 to 19 wherein the screw shaft 19 is electrically driven in lieu of being belt driven, the housing 90 in which said shaft 19 is journalled (see Fig. 17) has a central lateral extension 91. In said extension is journalled a shaft 92 on the end of which is fixed a bevelled gear 93 which permanently meshes with a bevel gear 94. The latter has an elongated internally threaded hub 95 which is threaded on and adapted to reciprocate the shaft 19 to and fro, in the manner hereinafter explained, according to the direction of the current flowing through the motor circuit. The shaft 92 is operated by means of an electric motor 96 to which it is coupled and said motor is controlled by a reversing switch 97, which is operated by a floating lever 98 through a pin and spool connection. Said lever 98, which is fulcrumed on a slide bar 99 mounted on the main support plate 100, has a fork 101 at its rear end to receive a trunnion carried by an extension of the block 103 which corresponds generally to the block 34 and which latter is clamped to the screw shaft 19. A rocker shaft 104 is journalled on the housing 90 and the same carries at its forward end a rocker arm 105 which is linked to a post or standard 106 secured to slide rod 99. The pendulum arm 107, which carries the weight 44, is fixed to the rear end of the rocker shaft 104.

In the dual wheel unit illustrated in Figs. 28 and 29, the reference numeral 110 designates the hub on which the dual wheels 111 are mounted for independent rotation. Said hub 110 is pivoted on a horizontal trunnion 112 carried by axle 113 whereby the same can be tilted or reciprocated by shaft 19 acting through block 34 and links 35 as above explained.

As is apparent from the foregoing, the wheel tilting mechanism which is applied to the front and rear wheels of the vehicle are essentially similar, except for the necessary modifications, as described herein, whereby the same is adapted for application to the front axle assembly.

The electrically operated mechanism illustrated in Figs. 16 to 19 is especially adapted for application to trailers of an automobile cargo train since each trailer can be equipped with its own wheel tilting mechanism unit including an electric motor and the current for operating the motor can be supplied from the main towing vehicle or truck.

Figure 3:
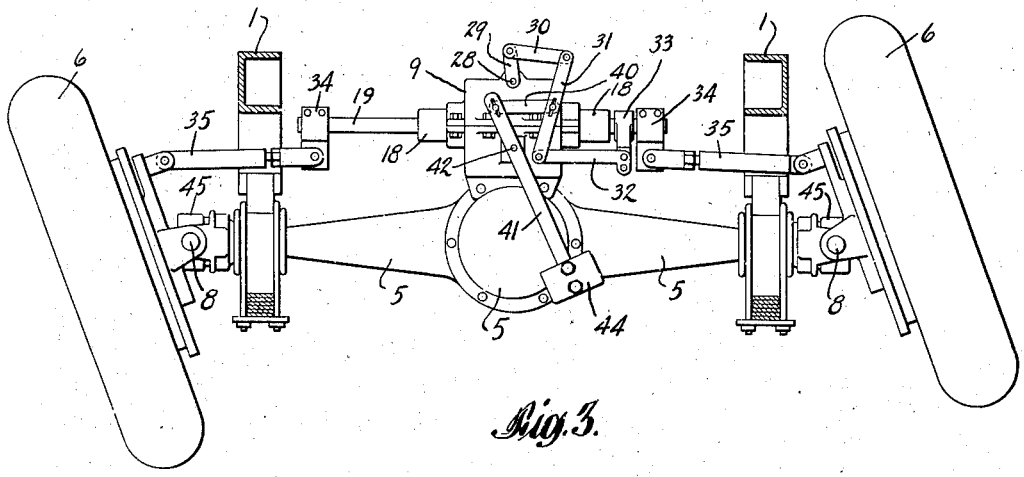

The operation of the wheel-tilting mechanism of the construction illustrated in Figs. 1 to 11 and 13 is as follows:

Assuming the front wheels are sharply turned to the left, as indicated in Fig. 13, due to an anti-clockwise rotation of the steering wheel by the driver, then such turning movement of the wheels will, unless the vehicle is travelling at an unusually slow speed, impart a sufficient side thrust upon the pendulum bob or weight 44 to thus cause the same to swing in an arcuate path to the right and such movement will cause the pendulum rod or arm 41 to assume the position shown in Fig. 3. The arm 41 being pivoted as above stated on the fulcrum 42, such movement will be transmitted through links 40, 31, 30 and rocker arm 29 to the rocker-shaft 28 which will move to the left (anti-clockwise) and assume the position shown in Fig. 3. Such anti-clockwise movement of rocker-shaft 28 will cause the yoke 27 to swing in an arcuate path to the right (viewed from the rear) carrying the sleeve 22 with it and thereby the clutch teeth 24 thereon will be caused to mesh with the clutch teeth 25 on bevel gear 17, which latter is continually rotated clockwise by the engine shaft, assuming that the latter is rotating clockwise (see arrows in Fig. 5) and thereby the coacting sleeves 22 and 20 will also be rotated clockwise with the consequence that the screw shaft 19, which is threaded into the rotating sleeve 20, will be shifted to the left (viewed from the rear). Thereupon, the rear wheels, which are operatively connected in the manner aforesaid to said screw shaft, will be tilted out of a vertical plane into the position shown in Fig. 3.

When the pendulum has come to rest at its ultimate position, whatever that may be, the bevel gear 17 will continue to rotate, the same being at the rear end of the vehicle permanently connected to the main propelling shaft of the vehicle and, in the case of the bevel gear 17 in the front gear case 10, being permanently connected to the engine shaft itself. Such continued rotation of the gear 17 will continue to effect the movement of the screw shaft 19 to the left (in the direction of the arrow shown in Fig. 3) until the arm 32, which as stated is rigidly secured to block 33 carried by said screw shaft, will be caused to impart a side-wise thrust to the left (viewed from the rear) upon the lower end of lever 31. The latter lever, acting through link 30, will thereupon cause the rocker-arm 29 to return to a vertical position (see Fig. 4) thereby disengaging the clutch member or sleeve 22 from engagement with the bevel gear 17 and causing said sleeve to return to the neutral position shown in Fig. 5.

It is, of course, understood that the front wheel-tilting mechanism functions the same as the rear wheel-tilting mechanism just described, except that in the case of the front wheel-tilting mechanism the stub-shaft, which corresponds to the rear sub-shaft 12, is connected through belt 13' directly to the engine shaft of the vehicle rather than to the propelling shaft 3.

Figure 4:
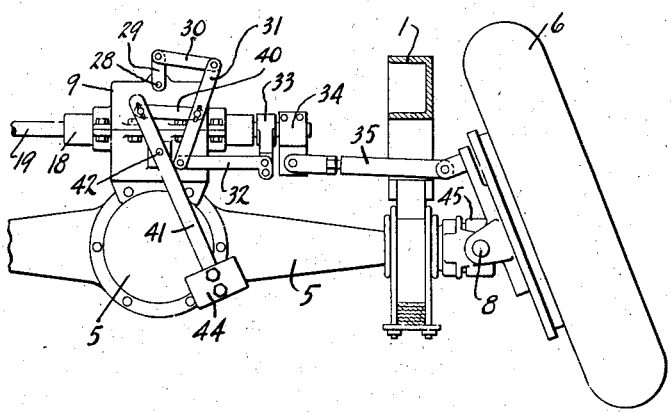
Fig. 4 is a fragmentary rear elevation, generally similar to Fig. 3, but showing the position of the parts following the disengagement of the coacting clutch elements from each other.

As will be apparent from the foregoing description of the operation of the wheel-tilting mechanism whereby the tilting of the wheels into the position shown in Figs. 3, 4 and 13 is accomplished, the reverse movement of the pendulum as it returns to a vertical or neutral position shown in Fig. 4, will effect the reverse movement of the clutch sleeve 22 whereupon the clutch teeth 24' thereon will be caused to engage clutch teeth 25' on the other bevel gear 17', with the consequence that said sleeves 22 and 20 will be rotated anti-clockwise (viewed from the bottom of Fig. 5) and the screw-shaft 19 will be continually moved to the right (viewed from the rear) so long as the gear 17' and sleeve 22 remain engaged. Similarly, the screw-shaft 19 will be shifted to the left, in the same manner should the pendulum initially swing to the left (viewed from the rear) from its normal perpendicular position rather than, as indicated in Figs. 3 and 4, to the right side of the vehicle. Such shift or movement of the shaft 19 to the left will in turn tilt the top of the wheels to the left from their normal vertical position, the extent of such tilt depending upon the extent of the swing of the pendulum.

In the construction shown in Figs. 14 and 15, the said pivoted dog 50 normally rests in the slot 52 of the raceway 51, said slot, as stated, being of a width to loosely or freely receive said dog. If the pendulum returns at moderate speed to a perpendicular position the dog 50 will readily enter the flared mouth of the slot and prevent a backlash movement of the pendulum to the opposite side of the vehicle, tending to remain in such slot until a further sudden sidewise thrust on the pendulum results in said dog being again drawn out of said slot and up onto the raceway 51.

In the construction illustrated in Figs. 16 to 19, the screw-shaft 19 is shifted to the right or left in response to the swinging of the pendulum to the left or right by said pendulum, the same acting through rocker shaft 104, rocker arm 105, post 106 to which it is pivotally linked, slide bar 99 and floating lever 98, and effecting the movement of the switch from its normal neutral position shown in Fig. 19, to either the forward or reverse drive position, depending upon whether the pendulum swings to the left or right (viewed from the rear of Fig. 16). As will be apparent, the closing of the motor circuit effects the clockwise or anti-clockwise rotation (viewed from the rear of the vehicle) of the shaft 92 which is coupled to the motor shaft and such shaft, acting through the bevel gear 93, respectively effects anti-clockwise or clockwise rotation (viewed from the bottom of Fig. 17) of the sleeve 95. The latter in turn effects the shifting of the screw-shaft 19 to the left or right respectively depending, as stated, upon whether the motor is driven in a forward or in a reverse direction by the current in the motor circuit, said direction of rotation being controlled by the direction of movement of the pendulum which in turn actuates the switch 97.

In the construction illustrated in Figs. 20 to 27, the front and rear pendulums are normally maintained in a vertical position, irrespective of incidental road shocks, while being free to move in response to side thrusts thereon, due to the positive turning of the front wheels or to a skidding tendency of the vehicle, by the pressure exerted upon the upper ends of said pendulums by the springs 67 and 82 respectively acting upon the lever 70 and detent 81. When, however, the driver turns the steering post and the steering wheel mounted thereon, either clockwise or anti-clockwise, the rod 57 will be actuated by the pitman shaft 55 and will in turn, acting through the crank arms 58 and 58', rock the shafts 59 and 75. Thereupon the cams 77 carried thereby will rotate therewith allowing the rollers 62 and 78 to ride over the peripheral cam faces of said cams 77 and almost instantly the compression exerted by the plungers 63 and 79 upon which rollers 62 and 78 are respectively mounted will be relieved with the corresponding relief of the pressure on the lever 70 and detent 81 against the upper end of the pendulums thus leaving the latter free to move in response to any centrifugal side thrusts imparted thereto.

Various modifications of the construction described herein may be made without departing from the spirit of my invention as embraced within the scope of the appended claims.

Having thus described my invention, what I claim is:

1. In wheel-tilting mechanism, for a motor driven vehicle, the combination comprising a traction wheel, a wheel suspension permitting the wheel to tilt out of a vertical plane and about an axis parallel to the plane of the wheel, means including pendular means and a non-rotatable screw shaft arranged to reciprocate to and fro in response to oscillatory movements of said pendular means and means for operatively connecting said traction wheel and said screw shaft.

2. In wheel-tilting mechanism, for a motor driven vehicle, the combination comprising a traction wheel, a wheel suspension permitting the wheel to tilt out of a vertical plane and about an axis parallel to the plane of the wheel, means including pendular means and a non-rotatable screw shaft, operatively connected to a shaft rotated by the driving-motor of the vehicle, arranged to reciprocate to and fro in response to oscillatory movements of said pendular means and means for operatively connecting said traction wheel and said screw shaft.

3. In a vehicle, the combination comprising a plurality of supporting wheels certain of which are for driving and others for steering the vehicle, a wheel suspension permitting each of at least two of said wheels to tilt out of a vertical plane and about an axis parallel to the plane of such wheel, mechanism for steering the vehicle and automatic means, responsive both to the speed of travel of the vehicle and to the degree each steering wheel of the vehicle is turned, but operable independently of the steering mechanism, for tilting at least two of the vehicle wheels so that the top thereof inclines toward the right or left and corresponds to the direction the front of the vehicle is turning, said automatic means, including pendular means, a non-rotatable screw shaft connected to opposite wheels of the vehicle and which shaft is adapted to be reciprocated transversely of the vehicle and motor operated means carried by the vehicle for reciprocating said screw shaft in response to oscillatory movements of the pendular means.

4. In a self-propelled vehicle, the sub-combination comprising a plurality of supporting wheels including at least one steering wheel and two driving wheels including wheel suspension means therefor whereby said wheels can each tilt out of a vertical plane and about an axis parallel to the plane of such wheel, a main propelling shaft operatively connected to said driving wheels, a non-rotatable, reciprocatable screw shaft connected to two opposing driving wheels, pendular means responsive to the speed and turning movements of the vehicle and clutch mechanism responsive to said pendular means for operatively interconnecting said main propelling shaft with said non-rotatable screw shaft and effecting the tilting of each driving wheel of the vehicle out of a vertical plane and about an axis parallel to the wheel plane.

5. In a wheel-tilting mechanism for self-propelled vehicles, the sub-combination comprising pendular means including a depending arm pivoted to the vehicle, an arcuate guide-way extending across a face of said arm, said guide-way having a vertical slot therein which has a flared mouth, a pivoted dog carried by said arm and which is of a size to freely enter said slot and snugly fit therein.

6. In a vehicle, the combination comprising a plurality of supporting wheels, certain of which are for driving and others for steering the vehicle, supporting axles for said wheels and to which said wheels are articulated so as to be capable of being each tilted out of a vertical plane and about an axis transverse to its axle, means for steering the steering wheels, including an oscillatable steering post, means for tilting certain of the wheels of the vehicle in response to a side thrust which would otherwise induce skidding of such wheels, the same including gravity responsive pendular means for controlling the degree of tilt of the vehicle wheels in consonance with the degree of the side thrust exerted upon the wheels, a cam member associated therewith and normally adapted to exert pressure thereon sufficient to maintain the same against chattering under incidental road shocks and a connecting rod operatively connecting said cam and the oscillatable steering post of the vehicle whereby, upon the turning of the steering wheels of the vehicle said pressure is relieved and said pendular means is free to oscillate without impedance by said cam.

7. In a vehicle, the sub-combination comprising steering mechanism for effecting the turning of the vehicle, power operated mechanism, including normally latched pendular means and a servo-motor whose operation is controlled thereby for tilting the wheels of the vehicle when the vehicle is turned when rounding a bend in the road, said power operated mechanism being adapted to be set in operation by the movement of the steering mechanism and also being responsive to sudden undue side thrusts sufficient to otherwise induce skidding of the vehicle.

8. In wheel-tilting mechanism for vehicles, the sub-combination comprising a steering and driving wheels for the vehicle, means for steering the steering wheels including an oscillatable steering post and a shaft operated thereby, pendular means for controlling the operation of the wheel-tilting mechanism, said pendular means including a swinging arm and a bob member, and means for normally holding said bob member against sufficient lateral movement under incidental road shocks to effect the operation of the wheel-tilting mechanism, while admitting of the oscillation thereof under severe side thrusts on the vehicle, including an elongated, pivoted dog member and an associated raceway member therefor, said raceway member having a vertical slot approximating in width the width of said dog member and which slot has a flared upper end to admit of the free entrance of the dog into said slot, and one of said members being carried by the said pendulum rod and the other by a support adjacent said rod.

9. In power operated wheel-tilting mechanism for vehicles, the sub-combination comprising an endwise reciprocatable wheel tilting shaft adapted to be articulated to the wheels of the vehicle to be tilted thereby, a reversible electric motor having a shaft operated thereby and operatively connected to said wheel-tilting shaft for effecting the to-and-fro reciprocation of said shaft during the respective forward and reverse rotations of the motor shaft, a reversing switch for controlling the forward and reverse rotations of said motor shaft and pendular means operatively connected to said switch for automatically controlling the operation and thereby causing forward or reverse rotation of the motor shaft in response to the to-and-fro movements of such pendular means.

10. In wheel-tilting mechanism, for a motor driven vehicle, the combination comprising a traction wheel, a wheel suspension permitting the wheel to tilt out of a vertical plane and about an axis parallel to the plane of the wheel and means including pendular means, a rotatable shaft adapted to be continually rotated by the driving-motor of the vehicle during the operation of said driving motor and a non-rotatable shaft operatively connected to said traction wheel and capable of endwise reciprocation in response to oscillatory movements of said pendular means for effecting the tilting movement of said traction wheel, said pendular means being capable of effecting the operative connection of said non-rotatable shaft and said rotatable shaft.

11. In wheel-tilting mechanism, for a motor driven vehicle, the combination comprising a traction wheel, a wheel suspension permitting the wheel to tilt out of a vertical plane and about an axis parallel to the plane of the wheel and means including pendular means, a shaft operatively connected to the driving motor of the vehicle and adapted to continually rotate during the operation of said driving motor and a non-rotatable shaft, operatively connected to a shaft rotated by the driving-motor of the vehicle, said pendular means serving to operatively connect said non-rotatable shaft and said rotatable shaft upon movement thereof to one side or the other of its normal vertical position.

12. In wheel-tilting mechanism for motor driven vehicles, the sub-combination comprising a wheel-tilting screw shaft, a cooperating threaded sleeve mounted on said shaft intermediate the ends thereof, a second sleeve mounted on said first sleeve, said sleeves being keyed together so as to prevent relative rotation thereof while admitting of relative longitudinal movement thereof, an annular series of clutch teeth on each end of said second sleeve, opposing idling gears enveloping said screw shaft and capable of relative rotation but incapable of relative longitudinal movement with respect to said screw shaft, an annular series of clutch teeth on the lateral faces of the idling gears which are adjacent the terminal teeth of said second sleeve, said idling gears being spaced from each other a distance greater than the overall length of the second sleeve and the said series of clutch teeth on each of said idling bevel gears being so disposed and of such a configuration as to intermesh with the adjacent series of clutch teeth on said second sleeve when brought into contact with each other, a stub-shaft having a terminal bevel gear fixed thereto which is in permanent engagement with said bevel gears, an oscillatable, sleeve-shifting member for effecting the engagement between two adjacent series of clutch teeth on the bevel idling gears and said second sleeve, said sleeve-shifting member being in permanent engagement with but capable of limited peripheral movement on the said second sleeve.

13. In wheel-tilting mechanism, the sub-combination comprising an endwise reciprocatable wheel-tilting shaft, a sleeve-like clutch member having clutch teeth thereon for effecting endwise movement of said shaft, opposed idling gears enveloping said shaft and rotatably mounted with respect thereto, said idling gears each having a series of clutch teeth adapted to be brought into mesh with a different series of clutch teeth on said clutch member when brought into intimate engagement therewith, and means, including a pendulum, for controlling the engagement of the respective teeth on said idling gears with the teeth on the cooperating clutch members and means for effecting disengagement of the teeth of said idling gears and said clutch members when outward movement of the pendulum ceases.

JAMES DOBSON ALTEMUS.